United States Patent [19]

DeLange et al.

[11] Patent Number: 6,042,153

[45] Date of Patent: Mar. 28, 2000

[54] THREADED CONNECTION FOR INTERNALLY CLAD PIPE

[75] Inventors: Richard W. DeLange, Kingwood; Ghazi J. Hashem, Houston, both of Tex.

[73] Assignee: Grant Prideco, Inc., The Woodlands, Tex.

[21] Appl. No.: 09/030,459

[22] Filed: Feb. 25, 1998

[51] Int. Cl.$^7$ ........................................... F16L 9/14
[52] U.S. Cl. ........................... 285/55; 285/329; 285/383; 285/333
[58] Field of Search ............................. 285/55, 329, 383, 285/333

[56] References Cited

U.S. PATENT DOCUMENTS

| | | |
|---|---|---|
| 590,811 | 9/1897 | Storrow . |
| 595,437 | 12/1897 | Greenfield . |
| 2,233,734 | 3/1941 | Ely et al. . |
| 2,340,537 | 2/1944 | Keener . |
| 2,805,872 | 9/1957 | Routh . |

(List continued on next page.)

FOREIGN PATENT DOCUMENTS

| | | |
|---|---|---|
| 1187531 | 5/1985 | Canada . |

OTHER PUBLICATIONS

G. J. Petersen, "Recent Alloy Developments and Manufacturing Challenges for CRA Tubulars." *JPT*, Jun. 1996, pp. 517–518.

Brochure: C–II . . . For New Transportation System. Nippon Steel Corporation.

Bruce, Stuart and Thursfield, Trevor: "Extrusion of Seamless Stainless Steel Tubes," *Tube International*, Nov. 1997, pp. 439–442.

(List continued on next page.)

*Primary Examiner*—Eric K. Nicholson
*Attorney, Agent, or Firm*—Browning & Bushman

[57] ABSTRACT

A corrosion-resistant threaded connection including a first tubular member having an outer metal tube of corrosion-prone material and an inner metal lining of corrosion-resistant material, the first tubular member forming a pin connection having a nose portion comprising a ring of corrosion-resistant material secured, e.g., welded, to the tube of corrosion-prone material, a radially outwardly facing, annularly extending thread-free first pin shoulder being formed on the corrosion-resistant ring, the first member including an externally threaded portion providing male threads, and a second tubular member comprising a metal coupling having a first end and a second end and forming a first box connection and a second box connection, respectively, the coupling including an internally disposed annularly extending metal section of corrosion-resistant material disposed intermediate the ends of the coupling, each of the box connections comprising a radially inwardly facing, annularly extending box shoulder formed on the section of corrosion-resistant material, each of the box connections further including a threaded female portion having threads complementary to the male threads, the pin and box shoulders being sized and configured such that when first and second of the first tubular members are threadedly received in the first and second box connections, respectively, the pin and box shoulders are in metal-to-metal sealing engagement.

28 Claims, 5 Drawing Sheets

U.S. PATENT DOCUMENTS

| | | |
|---|---|---|
| 3,185,502 | 5/1965 | MacArthur . |
| 3,192,612 | 7/1965 | Elliott et al. . |
| 3,253,841 | 5/1966 | Ahmad . |
| 3,266,821 | 8/1966 | Safford . |
| 3,298,716 | 1/1967 | Taylor et al. . |
| 3,307,860 | 3/1967 | Blount et al. . |
| 3,427,050 | 2/1969 | Krieg . |
| 3,472,533 | 10/1969 | Turner . |
| 3,489,437 | 1/1970 | Duret . |
| 3,596,931 | 8/1971 | Mishler . |
| 4,026,583 | 5/1977 | Gottlieb . |
| 4,366,971 | 1/1983 | Lula . |
| 4,373,750 | 2/1983 | Mantelle et al. ............................ 285/55 |
| 4,507,842 | 4/1985 | Werner . |
| 4,509,776 | 4/1985 | Yoshida et al. . |
| 4,524,996 | 6/1985 | Hunt . |
| 4,537,428 | 8/1985 | Landriault . |
| 4,556,240 | 12/1985 | Yoshida ................................... 285/416 |
| 4,568,113 | 2/1986 | Axford et al. . |
| 4,679,294 | 7/1987 | Lomax ...................................... 285/55 |
| 4,706,997 | 11/1987 | Carstensen . |
| 4,773,479 | 9/1988 | Guy . |
| 4,852,655 | 8/1989 | Guy . |
| 4,856,828 | 8/1989 | Kessler et al. . |
| 4,883,292 | 11/1989 | Kuroki ...................................... 285/55 |
| 5,069,485 | 12/1991 | Allen et al. . |
| 5,282,652 | 2/1994 | Werner . |
| 5,320,388 | 6/1994 | Lacy et al. . |
| 5,405,171 | 4/1995 | Allen et al. . |
| 5,470,111 | 11/1995 | Nelson et al. . |

OTHER PUBLICATIONS

Chakravarti, Bhaven and Dobis, Jonathan: "Plant Maintenance Repairs Utilizing Clad Piping Spools to Improve Reliability," *Stainless Steel World*, Jan./Feb. 1997, pp. 38–42.

Dobis, Jonathan D. and Chakravarti, Bhaven: "Clad Piping Components for Refinery Applications," *Materials Performance*, Jul. 1997, pp. 29–35.

Miura, Ritsu and Akabane, Hiroa: "Recent Use and Developement of Clad Pipe," *Stainless Steel World*, Jan./Feb. 1997, pp. 60–65.

Roymans, Sjef: "Welding Experiences at P. T. McDermott Indonesia," *Stainless Stel World*, Jan./Feb. 1997, pp. 46–47, 49.

Sear, David: "Seamet: The Economical Clad Pipework Solution," *Stainless Steel World*, Jan./Feb. 1997, pp. 22–25.

Lawrence M. Friedman: "Overview of Controlled Deposition Welding," Edison Welding Institute, May 1996.

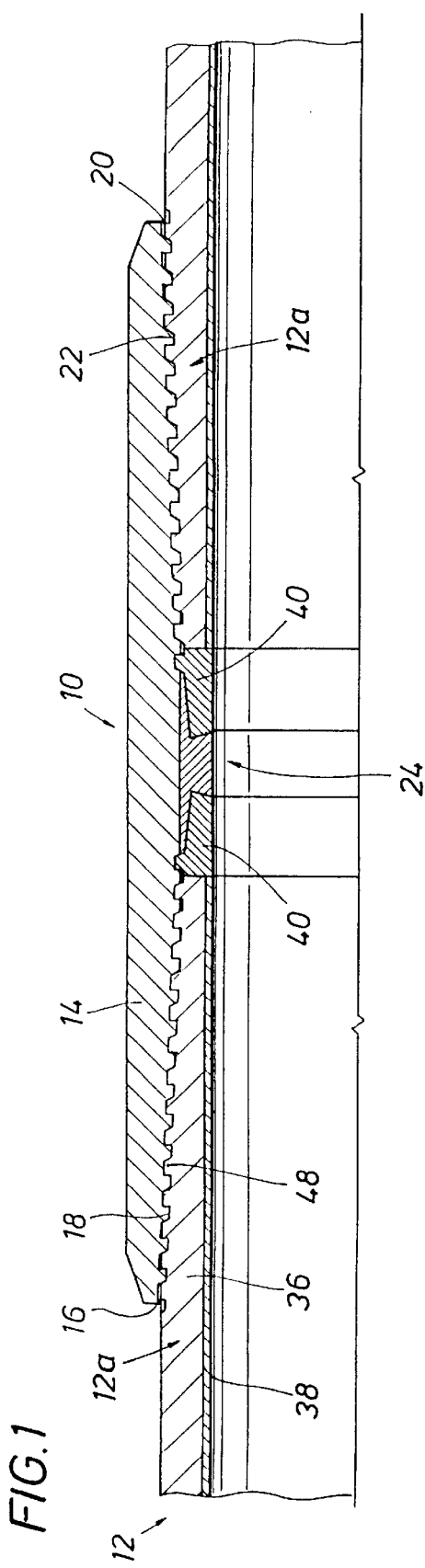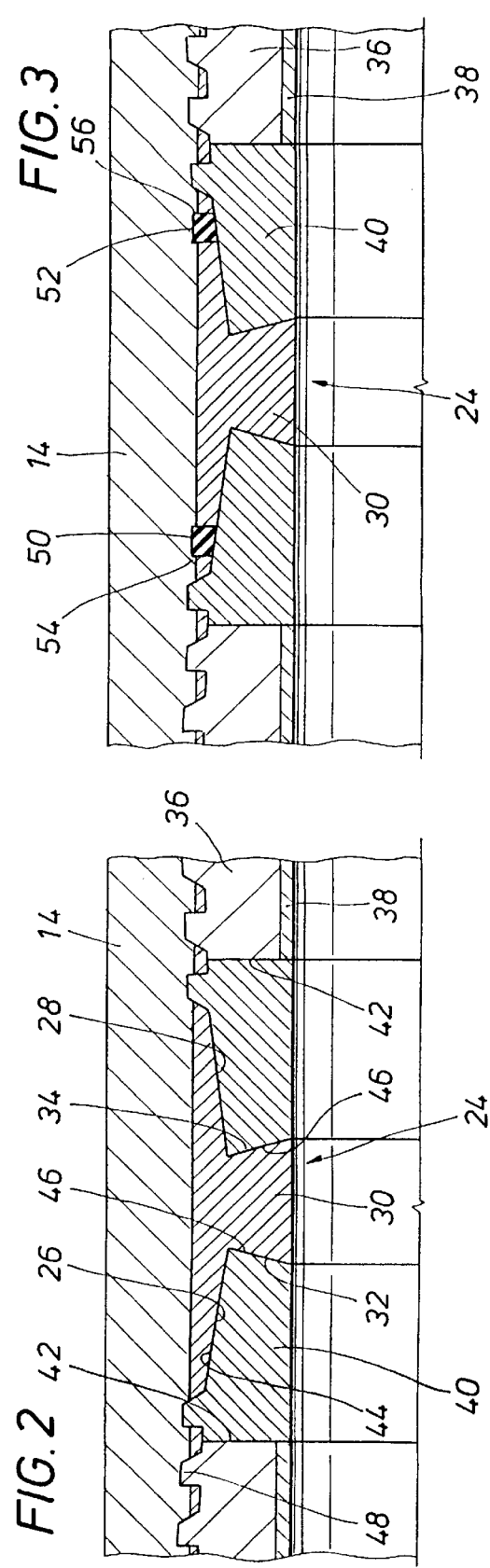

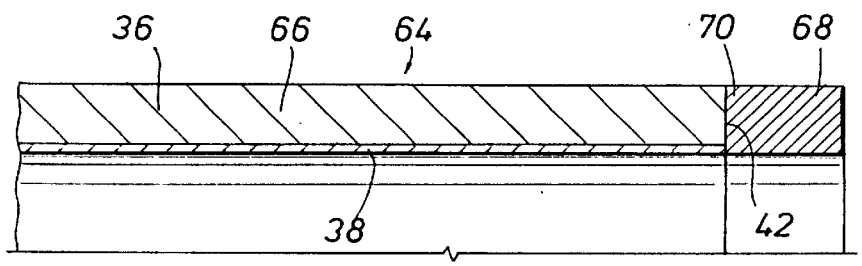
FIG. 7
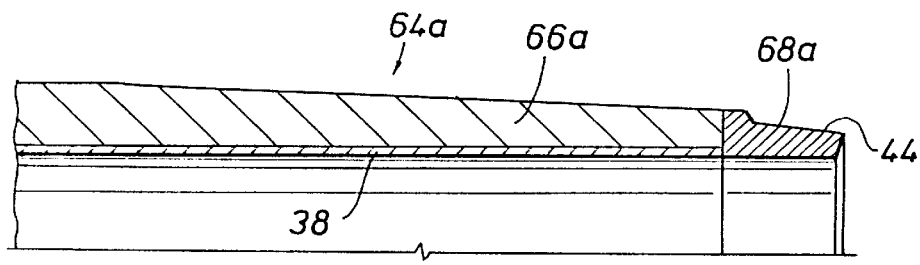
FIG. 8
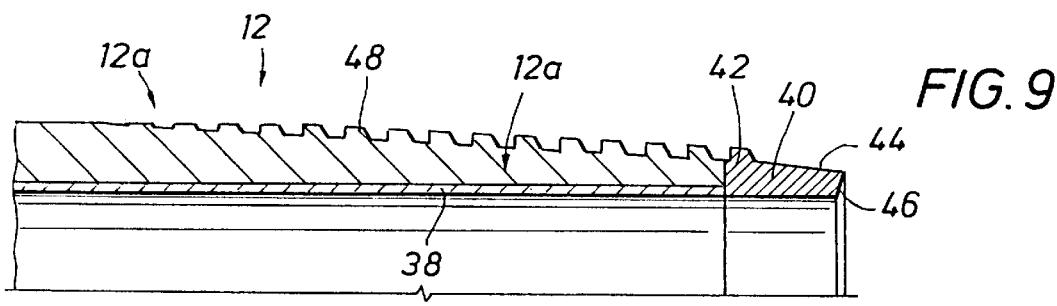
FIG. 9
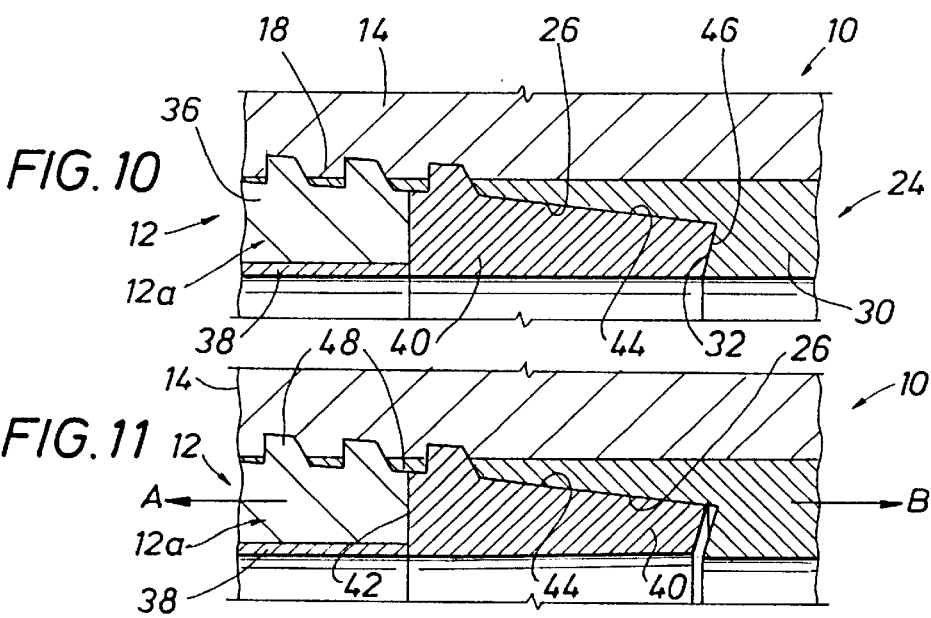
FIG. 10
FIG. 11

THREADED CONNECTION FOR INTERNALLY CLAD PIPE

BACKGROUND OF THE INVENTION

1. Field of the Invention

The present invention relates to threaded pipe connections and, more particularly, to a corrosion-resistant threaded connection assemblies for use with clad pipe such as can be used as oil and gas well tubing and casing, piping in chemical and other plants, oil and gas pipelines, and the like.

2. Description of the Prior Art

There are numerous instances where piping and pipelines are used for transporting fluids that are highly corrosive to materials such as carbon steel from which such pipe and pipelines are typically made. In particular, in the production of oil and gas, there is a growing need for corrosion-resistant alloy pipe, e.g., tubing, because of the continuing increase in the drilling of oil and gas wells into pay zones that produce highly corrosive fluids. To overcome the corrosion problems, and as well known to those skilled in the art, it is common to use lined steel pipe, which liners may be made of plastic, stainless steel, or other corrosion-resistant materials.

A typical multiple-walled composite pipe, e.g., a lined steel pipe, is a dual or double-walled pipe in which the inner wall is a liner tube made of a corrosion-resistant material e.g., stainless steel, or some other corrosion-resistant material (metal alloy) that serves as a conductor for the corrosive fluid, and an outer wall or pipe that is corrosion-prone, e.g., carbon steel and that is designed to provide strength to withstand the internal pressures of the corrosive fluid, as well as external forces such as external pressure, mechanical loading, etc.

Obviously, particularly in the case of tubing or casing, there are limitations on the length of such double-walled pipes due to conditions to which the pipes are subjected on site. Thus, in the case of tubing or casing strings and in the production of oil and gas, each joint of pipe is usually about 30–40 feet long while the tubing or casing string itself may be thousands of feet long. Accordingly, and as is well known in making up such tubing or casing strings, successive joints of tubing/casing are connected together using couplings until the desired length of string is achieved.

Typically, in these multiple-walled composite pipes, the inner tube or liner made of the corrosion-resistant material does a highly effective job of protecting the corrosion-prone outer tube or pipe. Indeed, methods of successively internally cladding corrosion prone pipe with a corrosion-resistant material are well known to those skilled in the art. The problem is not with the clad pipe, but rather where successive joints of the clad pipe are adjoined to one another by means of a coupling. For many years, the goal has been to create a "holiday-free" interface at the junction of the clad pipe and the coupling. It serves no purpose to connect clad pipe utilizing a coupling that is subject to corrosion since such a connection will sooner or later fail because the coupling will fail.

The prior art is replete with pipe couplings and assemblies ostensibly designed to overcome the problem of eliminating corrosive attack at the junction of the pipe and the coupling. However, insofar as is known to Applicants, none of these solutions have been readily embraced by the oil and gas industry, either because of cost factors, failures caused by corrosion, or lack of sufficient structural integrity at the pipe/coupling juncture.

In U.S. Pat. No. 5,282,652, there is disclosed a corrosion-resistant pipe coupling structure comprising a tubular coupling member having axially opposite ends thereof. Internal screw threads form boxes that engage male screw threads forming pins provided on the axially opposing end parts of two pipes to be connected, the internal surface of each of the pipes being resistant to corrosive fluids. An intermediate annular projection is provided on the inner surface of the coupling member and directed radially inwardly thereof to be abuttingly interposed between the opposing end parts of the pipes. The structure is characterized in that the intermediate annular projection is made of a corrosion-resistant material, at least in a radially intermost part thereof.

U.S. Pat. No. 4,026,583 also discloses corrosion-resistant tubing or casing for use in the oil and gas industry.

SUMMARY OF THE INVENTION

It is therefore an object of the present invention to provide a corrosion-resistant threaded connection assembly comprising a first tubular member having an outer tube of corrosion-prone material, e.g., carbon steel, and an inner lining of corrosion-resistant material, e.g., stainless steel or some other corrosion-resistant metal alloy, the first tubular member including a pin connection. The pin connection comprises a nose portion formed of a ring of corrosion-resistant material, e.g., a metal alloy, secured to the tube of corrosion-prone material, thereby forming an annular securing locus. The ring of corrosion-resistant material defines an annular, axially facing end surface and a radially outwardly facing, annularly extending thread-free shoulder formed on the corrosion-resistant ring and an axially extending, externally threaded portion providing male threads and extending axially inwardly of the pin shoulder and end surface, the securing locus being disposed intermediate the end surface and the end of the externally threaded portion distal the end surface. The assembly further includes a second tubular member comprising a coupling having a first end and a second end, the coupling having a first box connection formed in the first end and a second box connection formed in the second end. The coupling further includes an internally disposed annularly extending section of corrosion-resistant material disposed intermediate the first and second ends of the coupling. Each of the box connections comprises a radially inwardly facing, annularly extending box shoulder formed on the section of corrosion-resistant material. Each of the box connections further includes an axially extending, internally threaded portion providing female threads complementary to the male threads and extending axially outwardly of the thread-free box shoulder. The pin and box shoulders are sized and configured such that when first and second of the pin connections are threadedly received in the first and second box connections, respectively, the pin and box shoulders are in metal-to-metal sealing engagement.

BRIEF DESCRIPTION OF THE DRAWINGS

FIG. 1 is a half-sectional, elevational view of one embodiment of the assembly of the present invention;

FIG. 2 is an enlarged fragmentary portion of FIG. 1 showing in particular the engagement between the corrosion-resistant materials on the pin ends and the coupling;

FIG. 3 is a view similar to FIG. 2 showing the incorporation of a deformable seal ring in the assembly;

FIGS. 7–9 are half-sectional, elevational views showing how the threaded pin members of the assembly of the present invention are formed;

FIG. 10 is a fragmentary, half-sectional, elevational view showing one pin connection made up to one of the boxes in the coupling and showing engagement of the nose of the pin connection with a torque or makeup shoulder formed in the coupling;

FIG. 11 is a view similar to FIG. 10 showing the connection of FIG. 10 placed in tension such as would be encountered in a tubing or casing string such as would be used in an oil or gas well;

DESCRIPTION OF THE PREFERRED EMBODIMENTS

Figure 4:
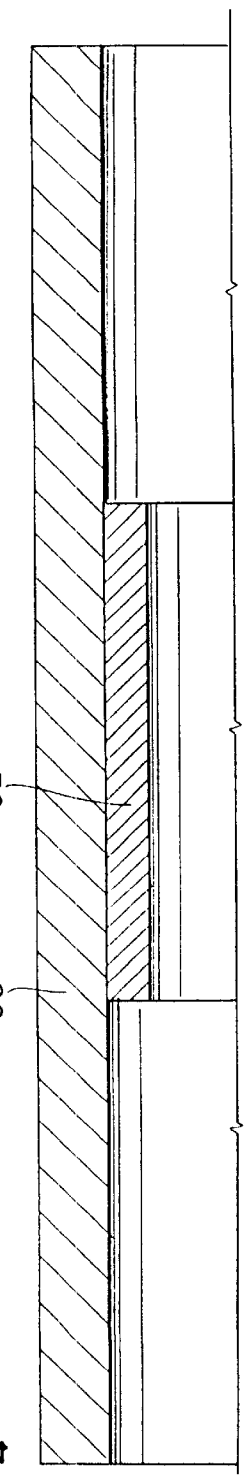
FIGS. 4–6 are half-sectional, elevational views showing sequentially how one embodiment of the coupling of the present invention is formed.

With reference to FIGS. 1 and 2, there is shown a corrosion-resistant threaded connection assembly according to the present invention comprising a coupling, shown generally as 10, and described more fully hereafter, and first and second tubular members or pipes, which could be tubing or casing, shown generally as 12 with pin connections (pins) shown generally as 12a described more fully hereafter.

Coupling 10 comprises a tubular member 14 having a first box end 16 with tapered, female threads 18 and a second box end 20 having tapered female threads 22. Coupling 10 further includes an annular insert, shown generally as 24, of corrosion-resistant material that is secure internally of tubular member 14 by ways well known to those skilled in the art and discussed hereinafter. Insert 24 defines a first, annularly extending conical thread-free box shoulder 26 and a second, annularly extending conical thread-free box shoulder 28. Insert 24 also forms an annular, radially inwardly projecting rib 30, rib 30 defining a first, annular axially facing abutment 32 and a second annular, axially facing abutment 34.

Pipes 12 are substantially the same in construction and comprise an outer tube 36 of a corrosion-prone material, e.g., carbon steel or the like, and an inner metal lining or liner of corrosion-resistant material 38, lining 38 being secured to tube 36 by methods well known to those skilled in the art and described more fully hereinafter. It will be understood that lining 38 extends for the full length of pipe 12. As noted, each of pipes 12 form a pin connection 12a having a nose portion formed of a ring 40 of corrosion-resistant material that is secured as by welding, as at 42, to tube 36, weld 42 forming an annular weld locus between ring 42 and pipe 36. Ring 40 further includes a radially outwardly facing, annularly extending, conical, thread-free pin shoulder 44 for a purpose hereinafter described. Ring 40 also defines an axially facing, annularly extending end surface 46. As can be seen, particularly with reference to FIG. 2, rib 30 is of a dovetail configuration and end surfaces 46 on pins 12a are complementarily shaped. Each of pins 12a further includes a tapered male threaded portion 48 extending axially outwardly of pin shoulder 44. It can thus be seen that when pipes 12 are received in coupling 10 such that threads 48 on first pin 12a and threads 18 in first box end 16 and threads 48 on second pin 12a and threads 22 in second box end 20 are threaded together, and when end surfaces 34 on pins 12a engage abutments 32 and 34 to the desired makeup torque, forming "torque shoulders," the coupling 10 and the pins 12a will be in metal-to-metal sealing engagement. To this end, shoulders 26 and 44 with respect to first box end 16 and 28 and 44 with respect to second box end 20 are sized and configured such that when the pins 12a are threadedly received in the coupling 10, shoulders 26 and 44 in the first box end form an interference, metal-to-metal seal, and likewise shoulders 28 and 44 in the second box end form an interference, metal-to-metal seal. It will thus be appreciated that a "holiday-free" zone has been created at the juncture of the pipes 12 and the coupling 10 in that in order for any corrosion-prone material to be exposed to corrosive fluids passing through pipes 12 and coupling 10, such fluid must leak past the metal-to-metal seals formed by the engaged shoulders 26, 44, and 28, 44. In other words, the flowing corrosive fluid sees only corrosion-resistant material, not only internally of the pipes 12 with respect to the lining 38, but also with respect to any of the components making up the threaded connection comprised of coupling 10 and the pins 12a formed on pipes 12. As noted above, it is important that the juncture of the pipes 12 and the coupling 10 be constructed in such a fashion that any corrosive fluids passing through pipes 12 and coupling 10 be prevented from contacting any corrosion-prone material making up either pipes 12 or coupling 10. Thus, for example, whatever technique is used to secure ring 40 to pipe 12 must eliminate the possibility that there will be any corrosion-prone material disposed between lining 38 and ring 40 so that corrosive fluids can pass the juncture of lining 38 and ring 40 and get between lining 38 and tube 36. Accordingly, any method or technique used to secure ring 40 to pipes 12 will ensure that corrosion-resistant material spans any securing zone or locus between lining 38 and ring 40. This can be accomplished, for example, by using corrosion-resistant weld or brazing material In yet another technique, lining 38, prior to the time that ring 40 is attached to pipes 12, can be flared over the end of outer pipe 36 adjacent the ID and corrosion-resistant weld material used to form the securing locus between the ring 40 and lining 38 to ensure that there is no portion of corrosion-prone material forming pin 12a that is exposed to any corrosive fluid.

While as described above, ring 40 is secured to pipe 12 by means of welding, it will be appreciated that other techniques for securing ring 40 to pipe 12 can be used, i.e., the annular securing locus between ring 40 and pipes 12 can be formed by welding, brazing, or, in certain cases, with special adhesives that are not affected by any corrosive fluids. For example, the securing locus might be formed by an annular wafer of material disposed between ring 40 and the end of pipe 12, which can, by means of proper treatment, fuse, or form with ring 40 and pipe 12 some other kind of fluid-tight bond, e.g., an intramolecular bond, between ring 40 and pipe 12. As noted hereafter, ring 40, when the connection is fully made up—i.e., when coupling 10 and first and second pins 12a are threadedly received therein—is under compressive loading, which greatly expands the types of securing techniques and securing agents that can be employed to form the securing locus. While the securing locus, in this case described as weld 42, is simply shown as a line joint between ring 40, on the one hand, and pipe 36 and lining 38, on the other hand, it will be appreciated that this is for simplicity only and that the securing locus, e.g., the weld locus, can have a significant axial thickness depending upon the securing agent and/or securing technique employed. Another securing technique that can be advantageously employed in securing the corrosion-resistant ring 40 to the pipe 12 can be accomplished by a technique that employs temperatures below which there is no effect on the metallurgical properties of the ring and the pipe. Whatever the nature of the securing locus and/or the method used to achieve it, there must result a liner (38), pin (36), ring (40) juncture that is corrosion-resistant.

With respect to FIG. 3, there is shown a modification of the embodiment shown in FIGS. 1 and 2, wherein there are incorporated deformable seal rings 50 and 52, rings 50 and 52 being disposed in recesses 54 and 56 formed in first and second box ends, respectively. Seal rings 50 and 52 further ensure that any corrosive fluids that leak past the metal-to-metal seals will be prevented from contacting the interengaged threaded portions of the connection, which, as can be seen for the most part, are formed of corrosion-prone material.

Figure 5:
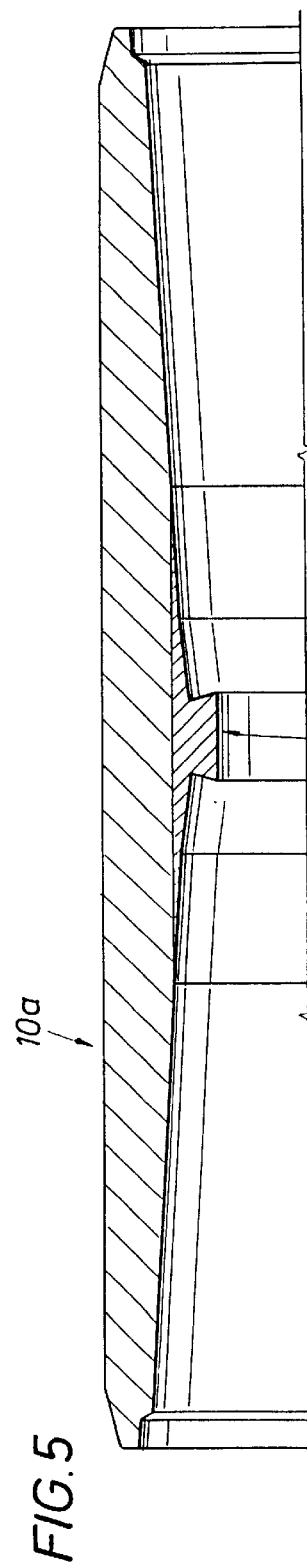
Figure 6:
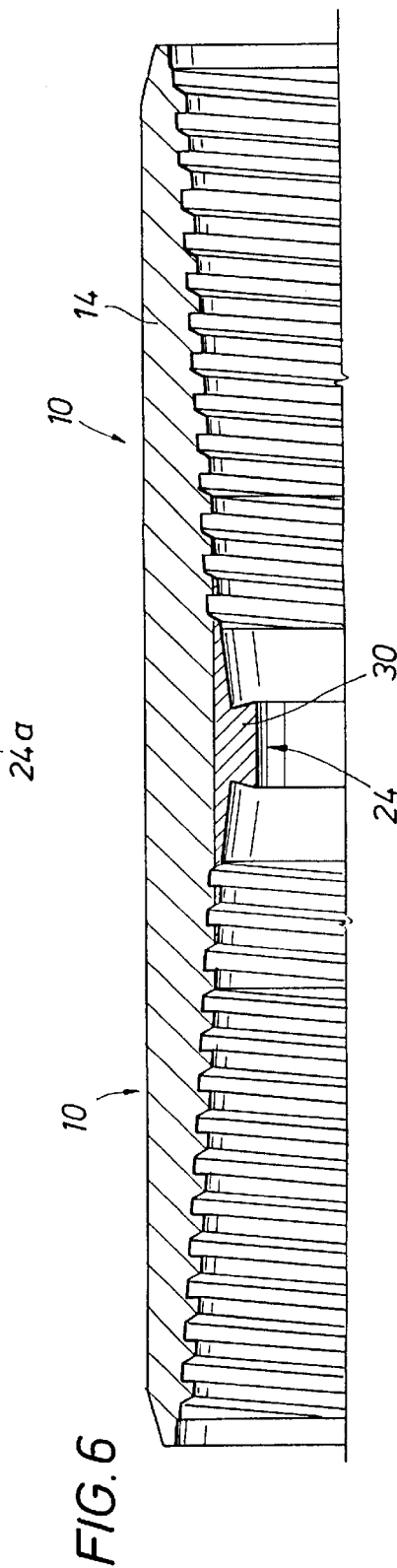

Attention is now directed to FIGS. 4–6, which show how a coupling for use in the assembly of the present invention can be constructed. Disposed in a tubular blank 60 is a corrosion-resistant, annular section 62 of corrosion-resistant material, annular section 62 generally being secured interiorly of tubular blank 60 by methods discussed hereinafter. Tubular blank 60 and corrosion-resistant section 62 are then machined, as shown in FIG. 5, to provide an unthreaded coupling preform 10a having an unthreaded corrosion-resistant insert preform 24a. Following threading, in the well-known manner, and as shown in FIG. 6, one achieves coupling 10 comprised of threaded tubular member 14 containing insert 24, identical to that shown in FIG. 1. While FIGS. 4–6 show construction of a coupling that is a composite, i.e., formed of the tubular blank 60 of a corrosion-prone material and an annular section 62 of corrosion-resistant material, it will be appreciated that the operations depicted in FIGS. 4–6 could be carried out to produce a coupling that is made entirely of corrosion-resistant material rather than the composite shown in FIGS. 4–6. In other words, the tubular blank 60 and an annular section 62 could comprise a monolith of corrosion-resistant material. Nonetheless, essentially the same machining/threading operations shown in FIGS. 4–6 would be conducted on the monolith.

FIGS. 7, 8, and 9 show a typical sequence of steps in forming the pin connections 12a of pipe 12. A tubular blank 64 formed of an outer tube of corrosion-prone material such as carbon steel 66 and an inner corrosion-resistant lining 38 is welded as by friction-welding or some other suitable welding technique, to an annular corrosion-resistant ring 68, the weld being indicated at 70. Following the securing of ring 68 to tubular blank 64, machining is conducted to provide a pin connection preform 64a, which results, as shown, in tube 66, being formed into a tapered tube 66a. Additionally, corrosion-resistant ring 68 is machined to provide a pin nose preform 68a, thread-free shoulder 44 being formed in such machining step. Lastly pin preform 64a is threaded to form pin connection 12a.

Figure 12:
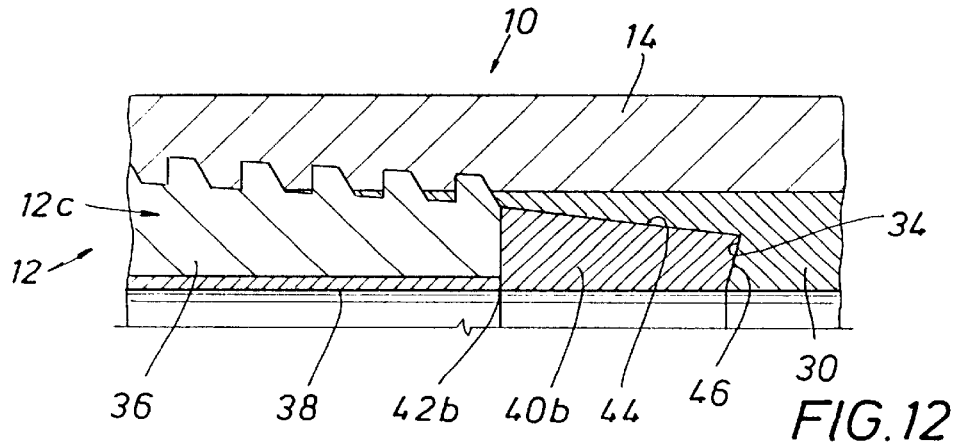
FIG. 12 is a fragmentary, half-sectional, elevational view showing another embodiment of the assembly of the present invention.

FIGS. 10 and 12 demonstrate two conditions of the assembly of the present invention, FIG. 10 showing the assembly made up, i.e., the pin connections threadedly received in the coupling, and in a "relaxed" condition, i.e., there being no axial forces acting on the assembly other than as imposed by the interengaged threads. FIG. 11 shows the connection of FIG. 10 in a typical condition such as would be experienced in an oil and gas well when a "string" of tubing or casing employing the threaded connection of the present invention is employed to connect successive joints of tubing, casing, or the like. As can be seen by the arrows A and B, the tension forces indicated by arrows A and B are transmitted from one pipe joint 12 to the successive pipe joint 12 through the coupling 10 by virtue of the interengaged threads 48 on the pins 12a with the threads 18, 22 in the coupling 10. This tension loading, if sufficiently high enough, will separate the abutment 32 formed on the rib 30 from the end surface 46 formed on the first pin connection 12a. Such separation is shown in exaggerated form in FIG. 11, it being understood that a like separation would occur between abutment 34 and end surface 46 formed on the second pin connection 12a. However, even though such separation of the torque shoulders may occur, the connection remains sealed because of the metal-to-metal, interference seal between shoulders 26 and 44. It will be understood that while only the first box end 16 is being described, a like situation applies with respect to the second box end 20.

Figure 13:
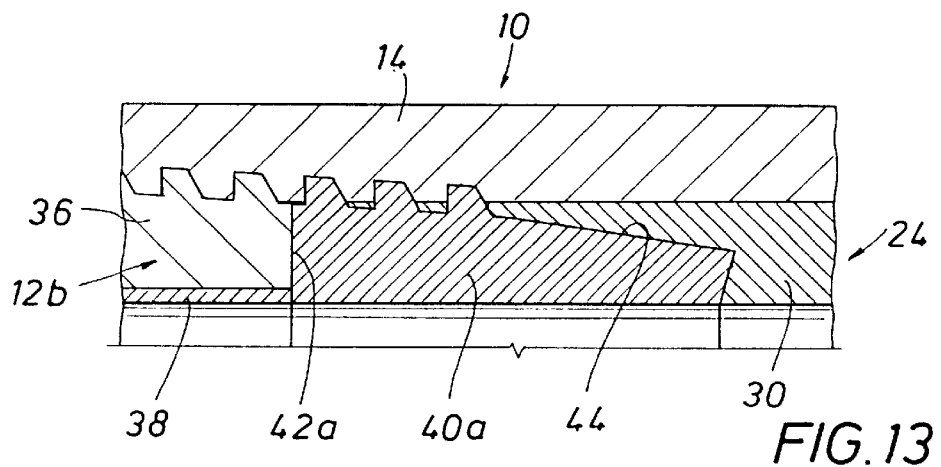
FIG. 13 is a fragmentary, half-sectional, elevational view showing another embodiment of the assembly of the present invention.

As can be seen from FIGS. 10 and 11, the weld zone 42 is disposed intermediate threads formed on the pin 12a such that at least the last thread closest the nose of the pin 12a is formed primarily at least of corrosion-resistant material forming ring 40. Positioning the securing or weld zone or locus between engaged threads helps to maintain the loading in tension on the assembly across that zone or locus to a minimum. While the embodiment of FIG. 11 shows the weld locus 42 being disposed generally between the first thread on the pin nose 12a and the next adjacent thread, FIG. 13 shows a condition where the weld locus has been moved further away from the nose of pin 12a, i.e., further into the threaded area. Thus, with reference to FIG. 13, ring 40a, shown as having a larger axial length than ring 40, is secured to pipe 36 by a weld zone 42a disposed generally in the area of the third and fourth threads on pin 12b, i.e., the weld zone is further up in the threaded zone. In general, it is preferred that the securing zone, e.g., weld zone, be disposed in the threaded area such that it lies between adjacent engaged threads since, as noted, this tends to maintain the loading in tension on the assembly across the securing zone to a minimum. Moving the securing zone further into the threaded area will generally mean that the axial length of the ring 40a is increased; e.g., compare the axial length of ring 48 with the axial length of ring 40. This is clearly desirable since such added axial length has the advantage that if the nose of the pin formed by the corrosion-resistant ring 40 or 40a is damaged, there is sufficient material remaining such that, with proper machining and threading, a new pin nose 12a can be formed without the necessity of having to add an entirely new corrosion-resistant ring.

With reference to FIG. 12, there is shown another embodiment of the assembly of the present invention wherein corrosion-resistant ring 40b is secured to pin 12c at a weld zone 42b, which is on the pin nose side of the first thread of pin connection 12c, i.e., the weld zone essentially lies in the thread-free zone and, more particularly, approximately at the start of the thread-free pin flank 44a. It will be apparent that in the embodiment shown in FIG. 12 with the weld zone out of the threaded portion of the connection, once the connector is made up, the weld zone 42b is placed in compression. In essence, ring 40b is essentially in a neutral state because the coupling 10, which transmits the tension between successive joints of pipe 12, has no effect on ring 40b in the sense that it is not exerting a significant pulling force on ring 40b. It will be appreciated that one of the features of the present invention is the fact that for all intents and purposes, the corrosion-resistant ring, e.g., ring 40, forming the nose of the pin is essentially placed in compression when the assembly comprising the coupling 10 and the pipes 12 are made up to full makeup torque. This clearly minimizes the chances that the corrosion-resistant ring will be separated from the pipe 12 since, for all intents and purposes, the forces acting on the corrosion-resistant ring are tending to force those two members together. This unique construction places the corrosion-resistant rings under compressive loading, and as noted above, provides an expanded variety of securing techniques and agents, e.g., welding, brazing, etc., that can be used to secure the corrosion-resistant rings to the pipes.

Figure 14:
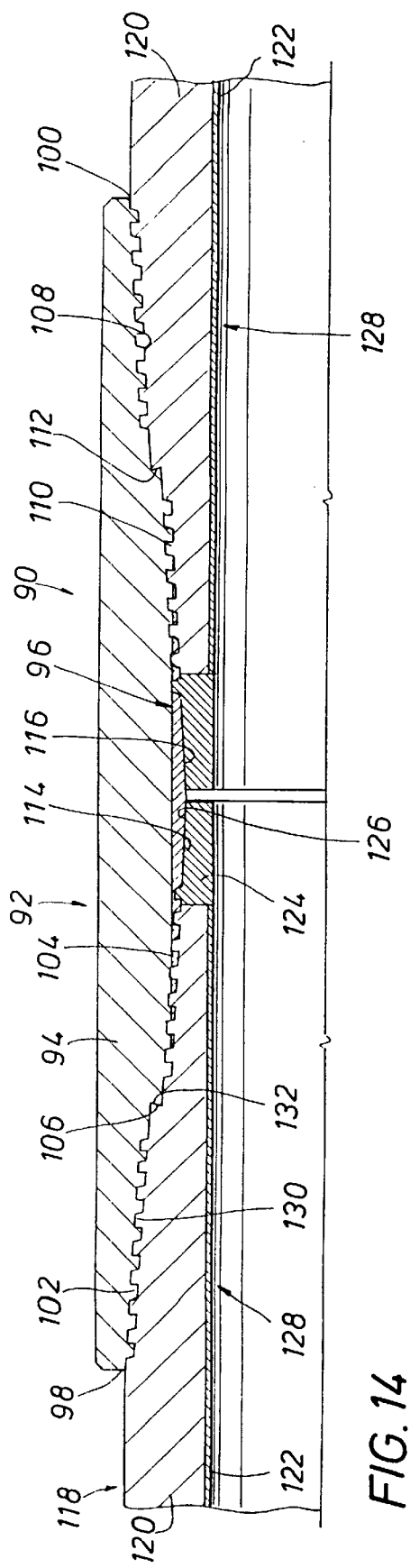
FIG. 14 is a view similar to FIG. 1 showing another embodiment of the assembly of the present invention.

Reference is now made to FIG. 14, which shows another embodiment of the connection assembly of the present invention. The assembly shown in FIG. 14, indicated generally as 90, is what is referred to in the industry as a stepped thread design. The coupling, shown generally as 92, comprises a tubular member 94 having a corrosion-resistant, annular insert 96 disposed generally centrally therein. There are thus defined first and second box connections 98 and 100, respectively. First box connection 98 is provided with a first, tapered, axially extending, internally threaded female portion 102 and a second axially extending, internally threaded female portion 104, threaded portions 102 and 104 being axially spaced from one another and separated by a makeup or torque shoulder 74. As in the case of box connection 98, box connection 100 is likewise provided with a first, axially extending, internally threaded female portion 108 and a second, axially extending internally threaded female portion 110, threaded sections 108 and 110 being displaced axially from one another and separated by a torque or makeup shoulder 112. So-called stepped threads as described above having makeup or torque shoulders separating the axially spaced stepped threaded portions are well known and are shown, for example, in U.S. Pat. Nos. 4,161,332 and 4,192,533 and patents referenced therein, all of which are incorporated herein by reference for all purposes. Insert 99 is provided with a first annular, radially inwardly extending surface 114 in box 98 and a second annular, radially inwardly extending sealing surface 116 in box 100.

The assembly shown in FIG. 14, as those described above, further includes an elongate tubular member 118 comprising an outer pipe 120 of corrosion-prone material and an inner lining 122 of corrosion-resistant material. As in the manner described above with respect to ring 40 and pipe 36, pipe 120 is secured to an annular ring 124 of corrosion-resistant material, ring 124 being provided with an annularly extending, radially outwardly facing sealing surface 126. Tubular member 118 forms a pin connection 128 formed by a first threaded male portion 130 and a second threaded male portion 132, threaded male portions 130 and 132 being axially spaced from one another, a first annular, axially facing makeup shoulder 134 being formed between threaded male portions 130 and 132. It will thus be apparent that when first and second pin connections 128 are received in boxes 98 and 100, respectively, and makeup shoulders 106 and 134, on the one hand, and makeup shoulders 134 and 112, on the other hand, are engaged to the desired torque, a metal-to-metal seal will be formed between annular sealing surfaces 114 and 126 in box connection 98 and between sealing surfaces 116 and 126 in box connection 100. Once again, it will be seen that any corrosive fluids being carried through the connection assembly will "see" nothing but corrosion-resistant material inasmuch as the corrosion-prone portions of the assembly are protected from attack by the corrosive fluid by virtue of the corrosion-resistant lining 122, the corrosion-resistant insert 96, and the corrosion-resistant rings 124.

Figure 15:
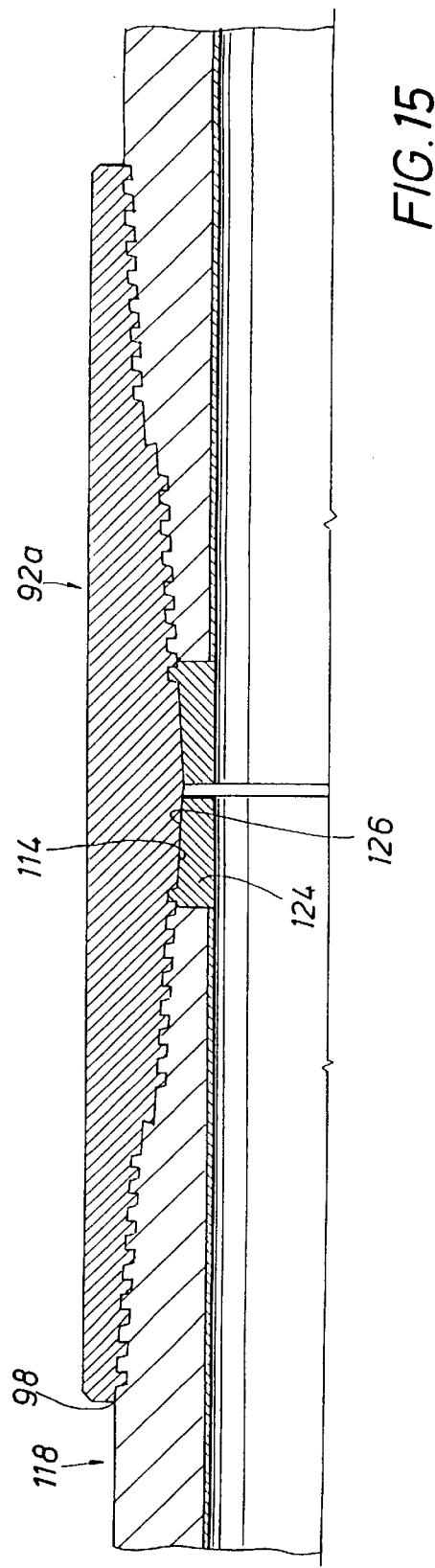
FIG. 15 is a view similar to FIG. 1 showing another embodiment of the assembly of the present invention.

With reference to FIG. 15, there is shown a slightly modified embodiment of the assembly shown in 14, the embodiment shown in 15 differing from that shown in FIG. 14 only in the fact that the entire coupling 92a is formed of corrosion-resistant material rather than being formed, as coupling 92, of a corrosion-prone tubular member 94 and an insert of corrosion-resistant material 96.

Figure 16:
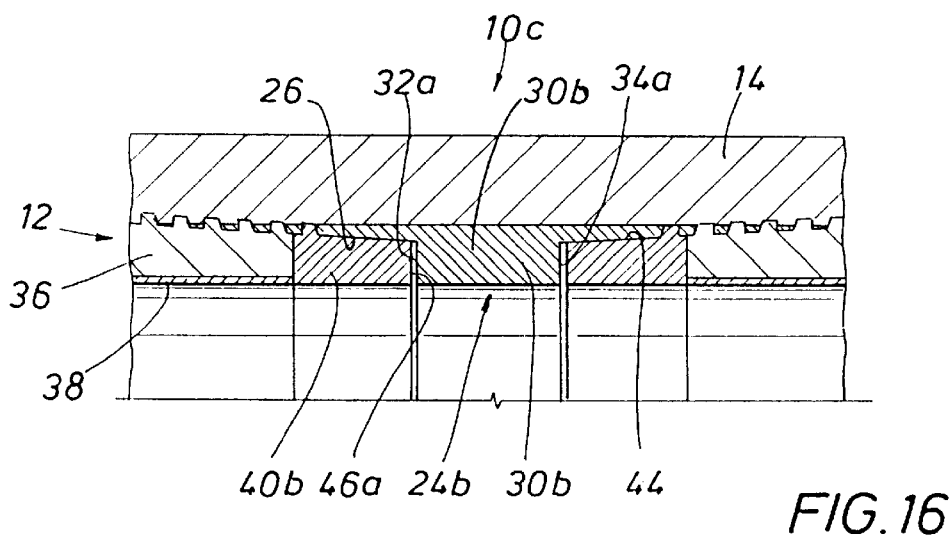
FIG. 16 is a fragmentary, half-sectional, elevational view showing another embodiment of the assembly of the present invention.

With reference now to FIG. 16, there is shown yet another embodiment of the connection assembly of the present invention. In the embodiment shown in FIG. 16, coupling 10c is similar to coupling 10 with the exception that insert 24b, rather than having an annular rib such as rib 30, shown in FIGS. 1–3, is provided with a rib 30b, which is not undercut and which rather is provided with abutment surfaces 32a and 34a, which are axially facing and which lie generally in planes perpendicular to the axis passing axially through the connection assembly. As can also be seen, abutment surfaces 32a and 34a do not form torque or makeup shoulders. In this regard, annular ring 40b is formed with an end surface 46a, which is annular and axially facing and which generally lies in a plane perpendicular to the long axis of the connection assembly. It will be seen that rather than being in contact, surfaces 24b and 46a with respect to the first box connection and surfaces 34a and 46a with respect to the second box connection are not in engagement, leaving a gap. However, since annular seal surfaces 26 and 44 are in metal-to-metal interference or sealing engagement, all corrosion-prone portions of the connection assembly are protected from attack by corrosive fluids flowing through the connection assembly.

Except for the embodiment shown in FIG. 16, most of the embodiments of the present invention have been described with reference to an internal shoulder formed between the noses of the pins 12a and a rib similar to rib 30 formed in the coupling 10. FIG. 16 demonstrates that such shouldering, while clearly desirable, is not a necessary limitation of the threaded connection of the present invention. Indeed, the threaded connection of the present invention can be constructed without annular ribs similar to rib 40, i.e., in such a manner that there is no portion of the coupling 10 that protrudes radially inwardly between the innermost ends of the pins 12a. Nonetheless, any such connection would have the metal-to-metal radial seals such as are formed by engaged shoulders 26, 44 and 28, 44, for example. It will also be appreciated by those skilled in the art that torque or makeup shoulders that are external to the connection assembly can be employed. Indeed, as shown in FIG. 14, in the case of a stepped thread design, such makeup or torque shoulders can be formed intermediate axially spaced stepped threaded portions. Whatever form or position of torque or makeup shoulder is employed, a feature of the present invention is the provision for metal-to-metal sealing between a radially outwardly facing, annularly extending surface or shoulder on the pin or male member and a radially inwardly facing, annularly extending surface or shoulder in the box connection formed in the coupling. Although the metal-to-metal seals are shown as being formed by the engagement of frustoconical surfaces, it will be appreciated that the invention is not so limited and that other complementarily shaped surfaces that can be forced into metal-to-metal sealing engagement can be employed.

It will be apparent that many modifications of the above invention not expressly described can be made. For example, and as shown, torque shoulders are not necessarily needed. Additionally, deformable seal rings can be used in the embodiments shown in FIGS. 14 and 15 and various thread forms can be used in any of the embodiments. It will be appreciated that the corrosion-resistant materials of the present invention can take many forms. Thus, for example, various liner compositions may be employed, depending upon the corrosiveness of the fluid being handled. For example, high alloy materials such as Hastelloy C, Iconel 625 may be used for extremely aggressive and corrosive environments, whereas lesser alloy-containing steels such as 26 Cr-1-Mo, 28 Cr-4-Mo, 17-4-PH, and Carpenter 450 can be used for less aggressive environments such as those containing chlorides, wet carbon dioxide, or the like. It will also be appreciated that the radial thickness of the corrosion-resistant liner can vary depending upon the material employed and the degree of corrosiveness of the fluids being handled.

Bonding between the corrosion-prone pipe and the corrosion-resistant liner and/or between the coupling and corrosion-resistant insert can be achieved by numerous methods well known to those skilled in the art and as exemplified in U.S. Pat. No. 4,026,583, incorporated herein by reference for all purposes. Accordingly, the bond between the pipe and the liner may be a braze bond, as, for example, which may be achieved by heating of the liner to brazing temperatures, in which case the liner outer surface would have a liquefying temperature substantially lower than that of the corrosion-prone pipe. As an example, the liner could include a metallic outer coating such as copper, which liquefies at a relatively low temperature and, which once liquified, would bond the corrosion-resistant liner to the corrosion-prone pipe. In still another manner, the bond between the liner and the corrosion-resistant pipe can be achieved by internally pressuring the liner to cause it to weld to the corrosion-prone pipe, the material of the liner diffusing into the metal of the corrosion-prone pipe. Such pressure may be created by an explosion within the liner or by a pressurizing liquid contained within the liner, as more fully disclosed in U.S. Pat. No. 4,026,583. The liner and/or insert may also be shrink-fitted into the pipe and/or coupling, respectively.

The foregoing description and examples illustrate selected embodiments of the present invention. In light thereof, variations and modifications will be suggested to one skilled in the art, all of which are in the spirit and purview of this invention.

What is claimed is:

1. A corrosion-resistant threaded connection assembly comprising:

a first tubular member comprising an outer metal tube of corrosion-prone material and an inner metal lining of corrosion-resistant material, said first tubular member comprising a pin connection, said pin connection comprising a nose portion comprising a ring of corrosion-resistant material secured to said tube of corrosion-prone material, forming an annular securing locus, said ring defining an annular, axially facing end surface, said pin connection further including a radially outwardly facing, annularly extending thread-free pin shoulder formed on said corrosion-resistant ring and an axially extending, externally threaded portion providing male threads and extending axially inwardly of said pin shoulder, said securing locus being disposed intermediate said end surface and the end of said externally threaded portion distal said end surface;

a second tubular member comprising a metal coupling having a first end and a second end, said coupling having a first box connection formed in said first end and a second box connection formed in said second end, said coupling including an internally disposed, annularly extending section of corrosion-resistant material disposed intermediate said first and second ends of said coupling, each of said box connections comprising a radially inwardly facing, annularly extending box shoulder formed on said section of corrosion-resistant material, each of said box connections further including an axially extending, internally threaded portion providing female threads complementary to said male threads and extending axially outwardly of said thread-free box shoulder; and said pin and box shoulders being sized and configured such that when first and second of said pin connections are threadedly received in said first and second box connections, respectively, said pin and box shoulders are in metal-to-metal sealing engagement, at least a portion of the first one of said male threads being formed on said ring of corrosion-resistant material.

2. The assembly of claim 1 wherein said ring of corrosion-resistant material is thread-free.

3. The assembly of claim 1 wherein said section of corrosion-resistant material defines an annular, radially inwardly extending rib between said first and second box connections.

4. The assembly of claim 3 wherein said rib assembly forms a first annular, axially facing abutment in said first box connection and a second annular, axially facing abutment in said second box connection.

5. The assembly of claim 4 wherein when said first and second pin connections are received in said first and second box connections, respectively, said axially facing end surface on said first pin connection is in engagement with said first abutment in said first box connection and said axially facing end surface on said second pin connection is in engagement with said second abutment in said second box connection.

6. The assembly of claim 5 wherein each of said abutments forms an undercut surface and said end surface of each of said pin connections is complementarily shaped.

7. The assembly of claim 1 wherein said coupling is made entirely of corrosion-resistant material.

8. The assembly of claim 1 wherein said coupling comprises an outer tubular portion of a corrosion-prone material and an inner, annular insert of corrosion-resistant material, said corrosion-resistant section being formed by said insert.

9. The assembly of claim 8 wherein said insert is welded to said outer tubular portion of said coupling.

10. The assembly of claim 1 wherein said externally threaded portion on said first tubular member defines a first two-step thread and each of said internally threaded portions in said second tubular member defines a second two-step thread, complementary to said first two-step thread.

11. The assembly of claim 10 wherein said first two-step thread defines a first threaded male portion and a second threaded male portion, axially spaced from said first threaded male portion, an annular, axially facing, pin makeup shoulder being formed between said first and second threaded male portions and each of said second two-step threads defines a first threaded female portion and a second threaded female portion, axially spaced from said first threaded female portion, a first annular, axially facing makeup shoulder being formed between said first and second threaded female portions in said first box connection, a second annular, axially facing makeup shoulder being formed between said first and second threaded female portions in said second box connection, said pin makeup shoulders and said first and second makeup shoulders being engaged when first and second pin connections are threadedly received in said first and second box connections, respectively.

12. The assembly of claim 11 wherein said pin makeup shoulder is undercut and said first and second makeup shoulders are complementarily shaped.

13. The assembly of claim 1 wherein one of said first tubular member or said second tubular member includes an annularly extending receiving formation for a deformable seal ring, and there is a deformable seal ring disposed in said receiving formation, said receiving formation and said seal ring being positioned such that such seal ring effects sealing between the interior of said second tubular member and the exterior of said first tubular member.

14. The assembly of claim 1 wherein said securing locus is disposed in said externally threaded portion.

15. A corrosion-resistant threaded connection assembly comprising:

a first tubular member comprising an outer metal tube of corrosion-prone material and an inner metal lining of corrosion-resistant material, said first tubular member comprising a pin connection, said pin connection comprising a nose portion comprising a ring of corrosion-resistant material secured to said tube of corrosion-prone material, forming an annular securing locus, said ring defining an annular, axially facing end surface, said pin connection further including a radially outwardly facing, annularly extending thread-free pin shoulder formed on said corrosion-resistant ring and an axially extending, externally threaded portion providing male threads and extending axially inwardly of said pin shoulder, said securing locus being disposed intermediate said end surface and the end of said externally threaded portion distal said end surface;

a second tubular member comprising a metal coupling having a first end and a second end, said coupling having a first box connection formed in said first end and a second box connection formed in said second end, said coupling including an internally disposed, annularly extending section of corrosion-resistant material disposed intermediate said first and second ends of said coupling, said section of corrosion-resistant material defining the entirety of an annular, radially inwardly extending rib between said first and second box connections, each of said box connections comprising a radially inwardly facing, annularly extending box shoulder formed on said section of corrosion-resistant material, each of said box connections further including an axially extending, internally threaded portion providing female threads complementary to said male threads and extending axially outwardly of said thread-free box shoulder; and said pin and box shoulders being sized and configured such that when first and second of said pin connections are threadedly received in said first and second box connections, respectively, said pin and box shoulders are in metal-to-metal sealing engagement.

16. The assembly of claim 15 wherein at least a portion of the first one of said male threads is formed on said ring of corrosion-resistant material.

17. The assembly of claim 15 wherein said ring of corrosion-resistant material is thread-free.

18. The assembly of claim 15 wherein said rib assembly forms a first annular, axially facing abutment in said first box connection and a second annular, axially facing abutment in said second box connection.

19. The assembly of claim 18 wherein when said first and second pin connections are received in said first and second box connections, respectively, said axially facing end surface on said first pin connection is in engagement with said first abutment in said first box connection and said axially facing end surface on said second pin connection is in engagement with said second abutment in said second box connection.

20. The assembly of claim 19 wherein each of said abutments forms an undercut surface and said end surface of each of said pin connections is complementarily shaped.

21. The assembly of claim 15 wherein said coupling is made entirely of corrosion-resistant material.

22. The assembly of claim 15 wherein said coupling comprises an outer tubular portion of a corrosion-prone material and an inner, annular insert of corrosion-resistant material, said corrosion-resistant section being formed by said insert.

23. The assembly of claim 22 wherein said insert is welded to said outer tubular portion of said coupling.

24. The assembly of claim 15 wherein said externally threaded portion on said first tubular member defines a first two-step thread and each of said internally threaded portions in said second tubular member defines a second two-step thread, complementary to said first two-step thread.

25. The assembly of claim 24 wherein said first two-step thread defines a first threaded male portion and a second threaded male portion, axially spaced from said first threaded male portion, an annular, axially facing, pin makeup shoulder being formed between said first and second threaded male portions and each of said second two-step threads defines a first threaded female portion and a second threaded female portion, axially spaced from said first threaded female portion, a first annular, axially facing makeup shoulder being formed between said first and second threaded female portions in said first box connection, a second annular, axially facing makeup shoulder being formed between said first and second threaded female portions in said second box connection, said pin makeup shoulders and said first and second makeup shoulders being engaged when first and second pin connections are threadedly received in said first and second box connections, respectively.

26. The assembly of claim 25 wherein said pin makeup shoulder is undercut and said first and second makeup shoulders are complementarily shaped.

27. The assembly of claim 15 wherein one of said first tubular member or said second tubular member includes an annularly extending receiving formation for a deformable seal ring, and there is a deformable seal ring disposed in said receiving formation, said receiving formation and said seal ring being positioned such that such seal ring effects sealing between the interior of said second tubular member and the exterior of said first tubular member.

28. The assembly of claim 15 wherein said securing locus is disposed in said externally threaded portion.

* * * * *